Converse & Bates,
Eraser.

No. 104,831. Patented June 28, 1870.

Witnesses:
Gustave Dieterich
Alex. F. Roberts

Inventors
M. D. Converse
F. A. Bates
Per
Attorneys.

United States Patent Office.

MACK DELORIMER CONVERSE, OF LONDON, OHIO, AND FRANK ATWILL BATES, OF BOSTON, MASSACHUSETTS.

Letters Patent No. 104,831, dated June 28, 1870.

IMPROVEMENT IN RUBBER ERASERS.

The Schedule referred to in these Letters Patent and making part of the same

To all whom it may concern:

Be it known that we, MACK DELORIMER CONVERSE, of London, in the county of Madison and State of Ohio, and FRANK ATWILL BATES, of Boston, in the county of Suffolk and State of Massachusetts, have invented a new and Improved Rubber and Eraser; and we do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
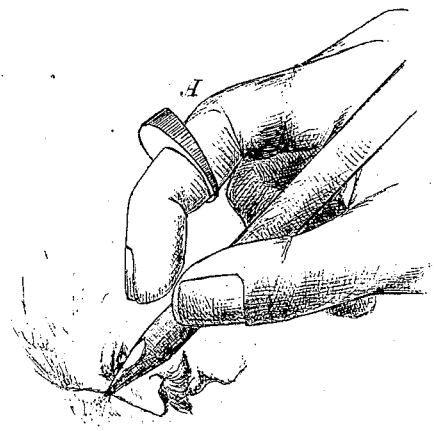
Figure 1 represents a perspective view of our invention, showing it applied.
Figure 2:
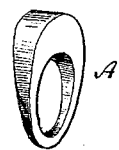
Figure 2 is a detail perspective view of the same.

This invention relates to a new manner of constructing India-rubber pen and pencil-mark erasers, to make the same more convenient for use than they were in the ordinary forms.

The invention consists in making the rubber in form of a ring, so that it may conveniently be slipped upon and held on the finger of the person using it.

In the drawing—

A represents the rubber, made in form of a finger-ring, so that it can be held to a finger in the manner shown.

When the rubber is to be used it can be readily applied to the paper, and is not apt to be mislaid during the act of drawing.

Another advantage of this form of rubber is, that it is not apt to be soiled as readily as the ordinary rubber, which is held between the fingers.

Having thus described our invention—

We claim as new, and desire to secure by Letters Patent,

The ring-shaped rubber eraser herein described.

MACK DELORIMER CONVERSE.
FRANK ATWILL BATES.

Witnesses:
GEO. W. MABEE,
ALEX. F. ROBERTS.